Oct. 8, 1935.  H. A. SILVEN  2,016,932
CONTROL MECHANISM FOR GRINDING MACHINES
Filed Aug. 13, 1934  2 Sheets-Sheet 1

Witnesses
Charles H. Amidon
Harold W. Eaton

Inventor
HERBERT A. SILVEN
By Clayton L. Jenks
Attorney

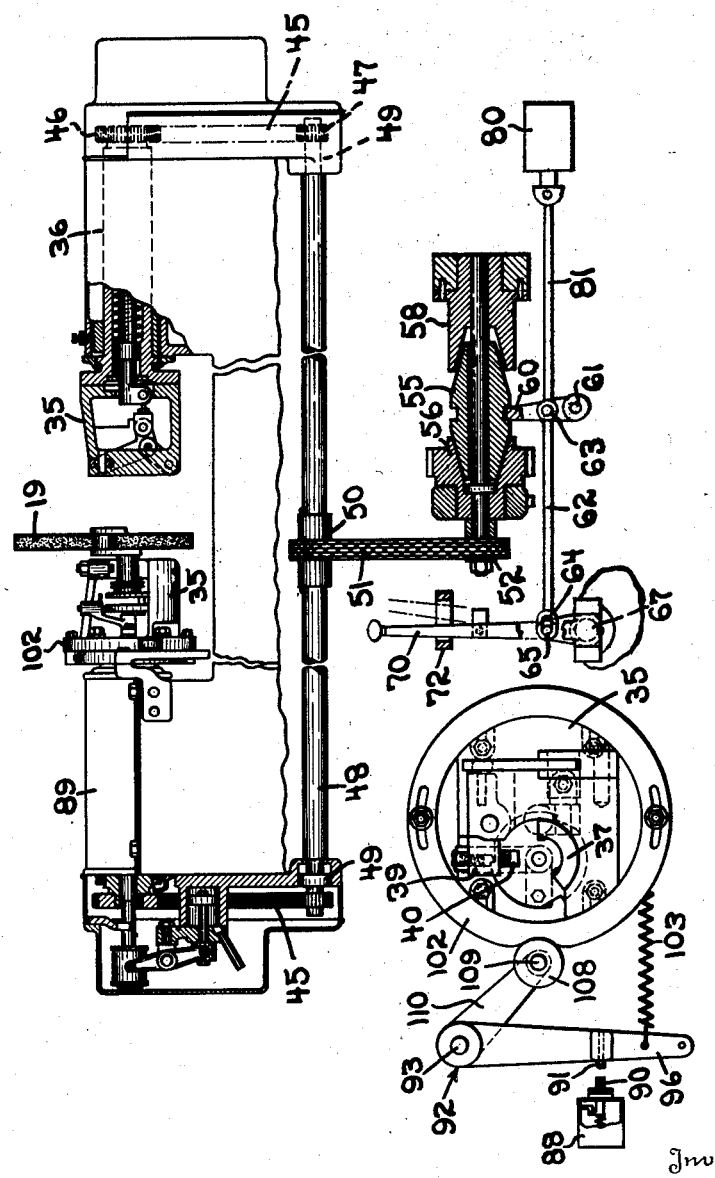

Patented Oct. 8, 1935

2,016,932

UNITED STATES PATENT OFFICE 2,016,932

CONTROL MECHANISM FOR GRINDING MACHINES

Herbert A. Silven, Worcester, Mass., assignor to Norton Company, Worcester, Mass., a corporation of Massachusetts Application August 13, 1934, Serial No. 739,616

REISSUED

10 Claims. (Cl. 51—237)

This invention relates to grinding machines, and more particularly to a control device for a work gripping and rotating mechanism of a grinding machine.

Heretofore, in the grinding of certain types of work requiring the use of a chuck or other work holding means, it has been necessary for the operator to manually locate the work holding member in a given position so that the work piece may be inserted in operative relation therewith. These mechanisms have required the operator to manually turn the work holder or chuck or to jog the control lever to engage the clutch and rotate the chuck to the predetermined loading position. Similarly, after the work piece has been finish ground, it is necessary for the operator to again jog the control lever or manually turn the work holder to locate the work holder in an upright or predetermined loading position.

A grinding machine of this type is disclosed in the prior patent to Silven and Belden No. 1,837,342 dated December 22, 1931. This machine is particularly adapted and intended for use in grinding of the offset crankpins of a crankshaft. The work piece is clamped in place in two opposed work holders or pot chucks and is then clamped rigidly in place by a spring actuated toggle clamping mechanism which is released after grinding by means of a fluid pressure piston and cylinder on each end of the table. The opposed pot chucks are rigidly mounted on a pair of opposed work rotating spindles which are synchronously rotated from a common drive shaft below the work supporting table. A manually operable control lever serves to actuate a clutch to start the work rotation when moved into one position, or when moved into the opposite position serves to disconnect the clutch and engage a brake to immediately and simultaneously stop the rotation of the work spindles and chucks. In such a mechanism, provision is made so that the pot chucks cannot be opened, that is, the jaws released to unclamp the work unless the pot chucks are in an upright position. In order for the chucks to be stopped in an upright position, it is necessary for the operator by experience to throw the manual control lever so as to stop the rotation of the work holders and work piece in the required position.

In production grinding, it has been found that it is not feasible for the operator to readily stop the chuck in the desired position, and it is necessary for the operator to jog the manual control lever to turn the pot chuck through a partial rotation to bring the chuck to the required loading position.

The necessity for manually positioning the work holder or chuck in a predetermined location for removal of the finish ground piece and loading of a new piece has resulted in a considerable loss of time in the cycle of operation, thereby impairing the efficiency of the machine.

It is the primary object of this invention to provide a work rotation control mechanism which automatically stops the rotation of the work holder in a predetermined or upright position for loading and unloading.

It is another object of the present invention to provide a suitable work rotation control mechanism which permits stopping either a single head or a double head work drive when the work holder or pot chuck are in any predetermined position.

It is a further object of this invention to provide a suitable electrical control mechanism which stops the work rotation when the work holders are in an upright position.

Other objects will be apparent from the foregoing disclosure. One embodiment of this invention has been illustrated in the drawings, in which like reference numerals indicate like parts:

Fig. 2 is a fragmentary longitudinal sectional view showing work rotation control applied to the work supporting and rotating mechanism of a double head crankpin grinding machine; and Fig. 3 is an end elevation of one of the work holders or pot chucks for supporting the work, showing the adjustable cam and limit switch of the control mechanism.

Figure 1:
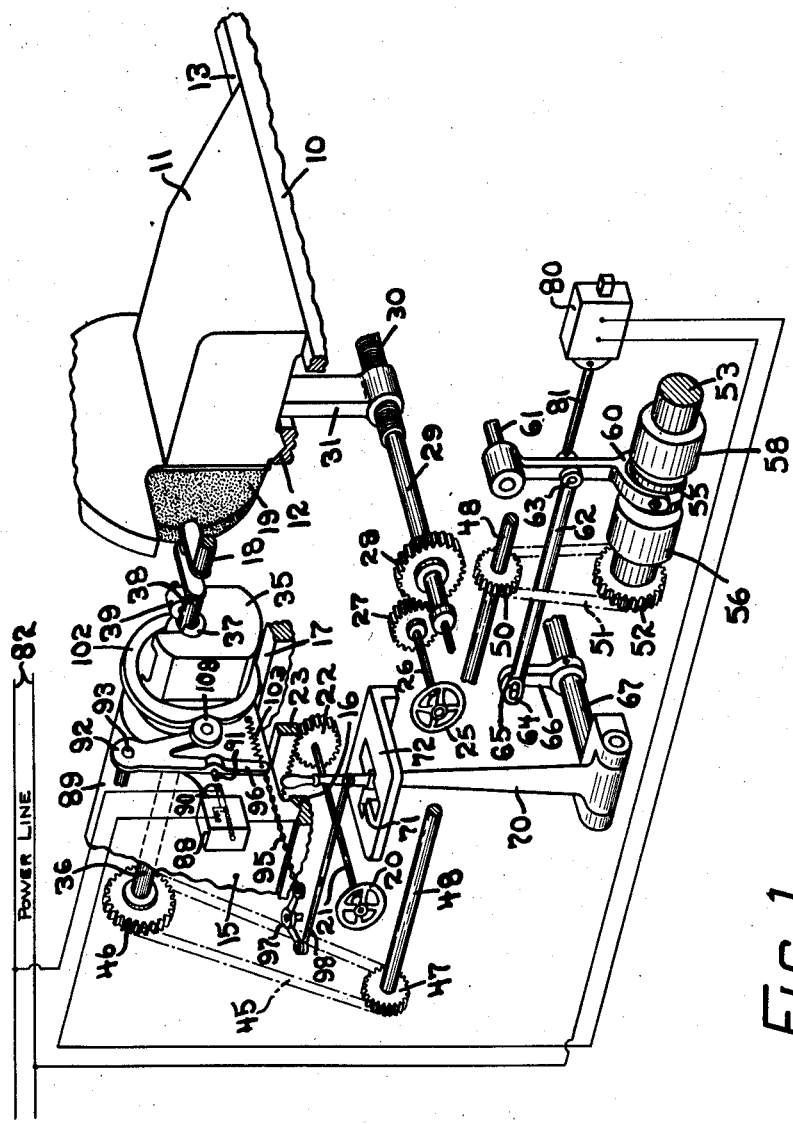
Fig. 1 is a combined diagrammatic fragmentary perspective view and electrical wiring diagram, showing the electrical control for automatically stopping the rotation of the work holder or pot chuck in a predetermined position.

This invention consists broadly in providing a control mechanism for grinding machine or other machine tool for automatically stopping a mechanism, such as the work rotating mechanism, when the work holder is in a predetermined position. In a grinding machine, such as a double head crankpin grinding machine, the control mechanism is arranged to automatically stop the work holders or pot chucks in an upright position so that after the grinding operation has been completed, the work holders or chucks are in a proper position for unclamping the work without dropping the same from the work holder. An electrical control device is provided to control the work rotating mechanism so that the work holder or support may be stopped in any predetermined position.

A machine illustrating one embodiment of this invention has been shown in the drawings, comprising a base 10 which carries a wheel slide 11 on the usual V-way 12 and flat-way 13 for a transverse movement relative to the base 10. A work supporting table 15 is mounted on the usual V-way 16 and a flat-way 17 for a longitudinal movement relative to the base 10 to position the work piece 18 in operative relation with a rotatable grinding wheel 19 on the wheel slide 11. The work supporting table 15 may be moved longitudinally by any suitable traversing mechanism, such as, for example, either a manually operable or a power actuated mechanism. For the sake of simplicity of illustration, a manually operable traverse mechanism has been illustrated, comprising a hand wheel 20 mounted on the outer end of a shaft 21 which is journaled in bearings (not shown) in the base 10. The shaft 21 carries a gear 22 which meshes with a rack bar 23 depending from the work table 15.

The grinding wheel slide 11 may be fed transversely either toward or from the work piece by means of any well known feeding mechanism, either manual or power actuated, to cause the desired feeding movement of the grinding wheel relative to the work. A manually operable feeding mechanism has been illustrated comprising a feed wheel 25 mounted on the outer end of a shaft 26 which is journaled in bearings (not shown) in the base 10. The shaft 26 carries at its inner end a gear 27 meshing with a gear 28 on the outer end of a shaft 29. The inner end of the shaft 29 is formed as a feed screw 30 meshing with a nut 31 depending from the wheel slide 11. It will be readily apparent from the foregoing disclosure that the grinding wheel 19 may be fed either toward or from the work piece 18 to grind the same to the required extent, or may be separated from the work piece by rotating the manually operable feed wheel 25 in the desired direction.

The work piece may be mounted on any suitable type of work holder, but for the sake of illustration a crankshaft work holder or pot chuck has been illustrated similar to that shown in the prior Patent No. 1,837,342, in which the crankshaft 18 is supported in a work holder 35 which is fixedly mounted on the outer end of a work rotating spindle 36. In grinding a crankshaft, opposed work heads 35 (Fig. 2) are provided, each of which is supported on opposed aligned work rotating spindles 36. The work holders 35 comprise a partial cylindrical supporting member 37 which is preferably rigidly fixed to the work holder 35 and is adapted to engage and support the end portion 38 of the crankshaft. A clamping jaw 39 is pivotally mounted on the head 35 and is provided with an adjustable clamping pin 40 which is opposed to the supporting member 37. A clamping mechanism is provided for actuating the jaw 39 to clamp and release the work before and after grinding. This mechanism has not been illustrated in detail, since it is not a part of the present invention. Such a mechanism is illustrated and described in detail in the prior Patent No. 1,837,342, to which reference may be had for details of disclosure.

Each of the spindles 36 is rotated by a link chain 45 which engages a sprocket 46 on the end of each spindle 36 and is driven by sprockets 47 mounted on opposite ends of a drive shaft 48 which is journaled in bearings 49 in the table 15. The shaft 48 is provided with a sprocket 50 which is driven by means of a link chain 51 from a sprocket 52 on a clutch shaft 53. The shaft 53 may be rotated by power from any suitable source, such as from an overhead belt drive or from a self-contained motor drive within the machine.

A shiftable clutch member 55 is slidably keyed to the shaft 53 and is arranged to be thrown towards the left (Figs. 1 and 2) into engagement with a positively rotated, power driven clutch member 56 to rotate the shaft 53 and the sprocket 51 so as to drive to the parts above mentioned to rotate the work holders 35. The clutch member 55 is moved toward the right (Figs. 1 and 2) to engage a stationary fixed brake member 58 so as to immediately stop the rotation of the shaft 53 and work holders 35.

The clutch member 55 is arranged to be shifted by a yoked member 60 which is pivotally mounted on a stud 61. The yoked member 60 is connected by a link 62, a pin 63, an elongated slot 64, a pin 65 on a rock arm 66. The arm 66 is fixedly mounted on a shaft 67 which is arranged to be rocked by a manually operable control lever 70.

In the position of parts as illustrated in Fig. 1, the clutch member 55 is in engagement with the brake member 58, and the work spindles are held against rotation. When it is desired to start the work rotation, the control lever 70 is moved toward the left, as viewed in Fig. 1, so that the lever 70 moves into a notch 71 in a plate 72. This movement shifts the clutch member 55 from engagement with brake member 58 into engagement with the clutch member 56 to start the rotation of the sprocket 52, link chain 51, sprockets 50, shaft 48, sprockets 47, link chains 45 and sprockets 46 to rotate the work spindles 36 and the work holders 35 to positively rotate the work piece for a grinding operation.

To attain the primary object of this invention, a control mechanism is provided which is so arranged as to stop the rotation of the work holders 35 when they are in an upright or predetermined position, that is, a position in which the work supporting member or surface 37 forms a support for the work even when the clamping jaws 39 are released so as to prevent the work from dropping out of the machine when it is unclamped. In the preferred construction, as illustrated in the drawings, this mechanism may comprise an electrical control system which is so arranged that when it is desired to stop the work rotation, an electrical apparatus is rendered effective to disengage the clutch member 55 and to shift the clutch member into a braking position to stop the work holders in a predetermined position. This control mechanism preferably comprises a solenoid 80 which is connected by a link 81 with the yoked member 60. The solenoid 80 is of the pull type and arranged, when energized, to rock the yoked member 60 to move the clutch member 55 toward the right, as viewed in Figs. 1 and 2, into engagement with a brake member 58.

In order to energize the solenoid 80 at the proper time, a limit switch 88 is provided in an electrical circuit. Power for the electrical circuit has been illustrated by the power lines 82 which are connected in series with the limit switch 88 and the solenoid 80 so as to energize the solenoid 80 at the desired time. The limit switch 88 is preferably mounted on the work head 89, and its plunger 90 is arranged in the path of a plunger 91 on a bell crank lever 92 which is pivotally mounted on a stud 93. During the grinding, when the work holders 35 are rotated, the limit switch 88 is held open. This is accomplished by means of a chain 95 which is connected to the lower end of an arm 96 of bell crank 92. The chain 95 is in turn connected to a bell crank lever 97, the other arm of which is connected by a link 98 with the control lever 70. It will be readily apparent from the disclosure in Fig. 1 that when the control lever 70 is swung toward the left, as viewed in Fig. 1, the bell crank 97 will be rocked in a clockwise direction to move the bell crank 92 also in a clockwise direction so that the pin 91 engages the limit switch plunger 90 to hold the limit switch in a normally open position.

A cam actuated control device is provided to stop the work holder 35 in the desired and predetermined position, namely, a position in which the supporting member 37 will serve as a support for the work piece or crankshaft even when the same has been unclamped. This mechanism may comprise a cam 102 which is adjustably mounted on one of the work heads 35. The cam is provided with elongated slots and clamping screws so that the position of the cam may be adjusted relative to the work holder 35. A cam follower roller 108 is mounted on a stud 109 on an arm 110 of the bell crank lever 92. A spring 103 tends to hold the roller 108 in engagement with cam 102.

The operation of the mechanism is readily apparent from the foregoing disclosure. The operator first adjusts the position of the cam 102 relative to the work supporting head 35 so that the low point or notch in the cam allows the roller 108 to drop into the position illustrated in Fig. 1. When the work holder is in this position, the limit switch 88 closes and thereby energizes solenoid 80. The energizing of solenoid 80 serves to engage the clutch member 55 with the brake member 58 so as to stop the rotation of the work holder in the desired position. After the cam 102 has been once adjusted, the cam may be locked in adjusted position so that on successive grinding operations, the work holder is always stopped in the same predetermined or upright position without attention on the part of the operator.

To start the work rotating after loading a new piece of work into the machine, the operator moves the control lever 70 in a counterclockwise direction (Fig. 1) into a full line position, as indicated in Fig. 2. This movement of the control lever 70 serves to throw the clutch member 55 into engagement with the positively rotated clutch member 56 to rotate the work supporting head 35. At the same time the control lever is moved in a counterclockwise direction, the link 98, bell crank 97, chain 95, serve to rock bell crank lever 92 in a clockwise direction so as to hold the limit switch 88 in an open position during the grinding operation when the work holder is rotating.

After the grinding operation has been completed and it is desired to stop the work rotation to permit removal of the finish ground piece of work, the operator moves the control lever 70 in a clockwise direction into the full line position as indicated in Fig. 1. This movement of the control lever serves to move the link 98, bell crank 97, chain 95, to permit the spring 103 to rock the bell crank 92 in a counterclockwise direction so as to bring the follower roll 108 into operative engagement with the cam 102. Due to the lost motion between the pin 65 and elongated slot 64, the movement of lever 70 does not disengage the clutch member. If the follower roller engages the concentric portion of the cam, then the switch 88 remains open and continues to remain open until the head has rotated through a partial rotation into the position illustrated in Fig. 1, in which the roller 108 engages the notched or low portion of the cam 102, thereby closing the limit switch 88 and to energize the solenoid 80, which serves to move the clutch member 55 from engagement with clutch member 56 into engagement with the brake member 58 to stop the rotation of the work holder 35 in a predetermined or upright position.

Having thus described my invention, what I claim as new and desire to secure by Letters Patent is:

1. In a cylindrical grinding machine, a rotatable grinding wheel a work support, a work holder rotatably mounted thereon, means to support a work piece thereon, means to continuously rotate said work holder to grind the periphery of the work piece, and automatically actuated means to stop said work holder in a predetermined position.

2. In a grinding machine, a work support, a work holder rotatably mounted on said support, means including a clutch to continuously rotate said work holder, and an automatically actuated mechanism actuated in timed relation with said clutch to stop the work holder in a predetermined loading position.

3. In a grinding machine, a work support, a work holder rotatably mounted on said support, a bearing support fixed on said holder for supporting a work piece therein, a clamp associated with said support to clamp a work piece in said holder, means to rotate said work holder, and automatically actuated means to stop the rotation of the work holder when the fixed support on the work holder is in a predetermined position.

4. In a grinding machine, a work support, a work holder rotatably mounted on said support and having a work supporting surface arranged to be loaded and support the work when in an upright position, a clamping member opposed to said supporting surface to clamp the work rigidly on said surface, means including a clutch to rotate said work holder, and automatically actuated means cooperating with said clutch to stop the work rotation when said surface of the work holder is in an upright position.

5. In a grinding machine, a work support, a work holder rotatably mounted on said support, a work supporting surface on said work holder which serves to align and support a work piece thereon, a clamping means on said work holder arranged to clamp the work piece rigidly in said surface, means including a clutch to rotate said work holder, a control cam adjustably mounted on said work holder, and a control device associated with said clutch and cam to automatically stop the rotation of the work holder in a predetermined or upright position.

6. In a grinding machine, a work support, a work holder rotatably mounted on said support, a fixed member on said work holder arranged to support and align a work piece thereon, a clamping means to clamp a work piece on said fixed member, means to rotate said work holder, and an electrically actuated cam controlled means to automatically stop the rotation of the work holder in a predetermined position.

7. In a grinding machine, a work support, a work holder rotatably mounted on said support, a fixed member on said holder arranged to support and align a work piece thereon, a clamping means arranged to clamp a work piece rigidly in said fixed member, means including a clutch to rotate said work holder, and an electrically actuated cam controlled mechanism associated with said clutch to automatically stop the rotation of the work holder in a predetermined position.

8. In a grinding machine, a work support, a work holder rotatably mounted on said support, a fixed member on said work holder to support and align a work piece thereon, a clamping means on said holder arranged to clamp a work piece rigidly in engagement with said fixed member, means including a clutch to rotate said work holder, a manually operable means to engage said clutch to start or stop the rotation of said work holder, an adjustable cam mounted on said work holder, a control means associated with said cam and rendered effective when the manual means is moved into a stopping position to automatically stop the rotation of the work holder when said fixed member is in a vertical or upright position.

9. In a grinding machine, a work support, a work holder rotatably mounted on said support, means including a clutch to rotate said work holder, manually operable means to actuate said clutch to rotate said work holder, a brake associated with said clutch to stop the rotation of the work holder, an adjustable cam mounted on said work holder, and an electrical control device including a switch associated with said cam and a solenoid arranged to move said clutch into engagement with said brake which is rendered effective when the manual means is moved to a stopping position to automatically stop the rotation of the work holder in a predetermined position.

10. In a grinding machine, a work support, a work holder rotatably mounted on said support, means including a clutch to rotate said work holder, a manually operable means to engage said clutch to start or stop the rotation of said work holder, a brake associated with said clutch to positively stop the rotation of the work holder, and an electrically controlled, cam actuated mechanism which is rendered effective to engage the clutch and to automatically engage the brake and stop the rotation of the work holder in a predetermined position.

HERBERT A. SILVEN.